Patented Dec. 30, 1952

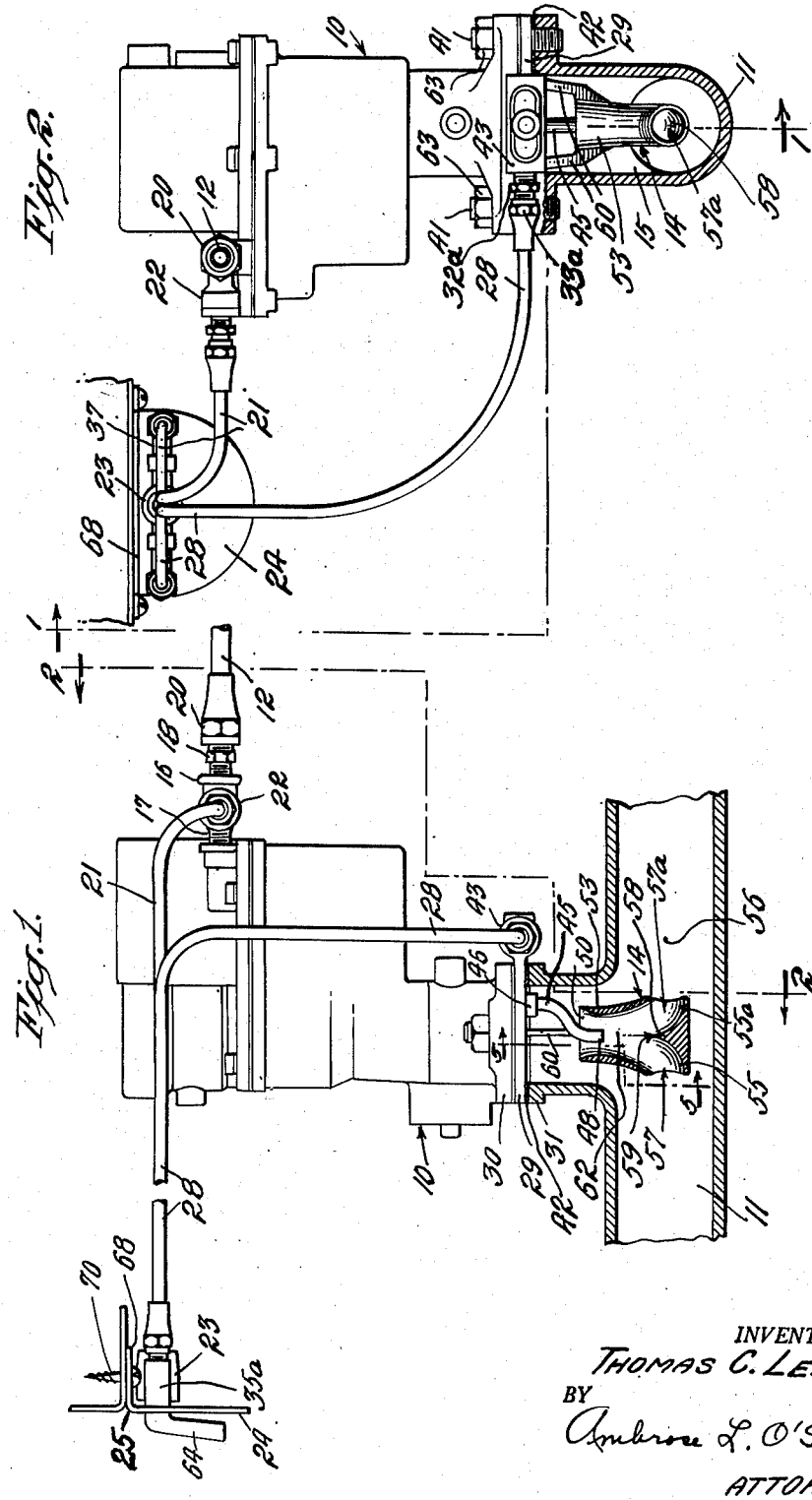

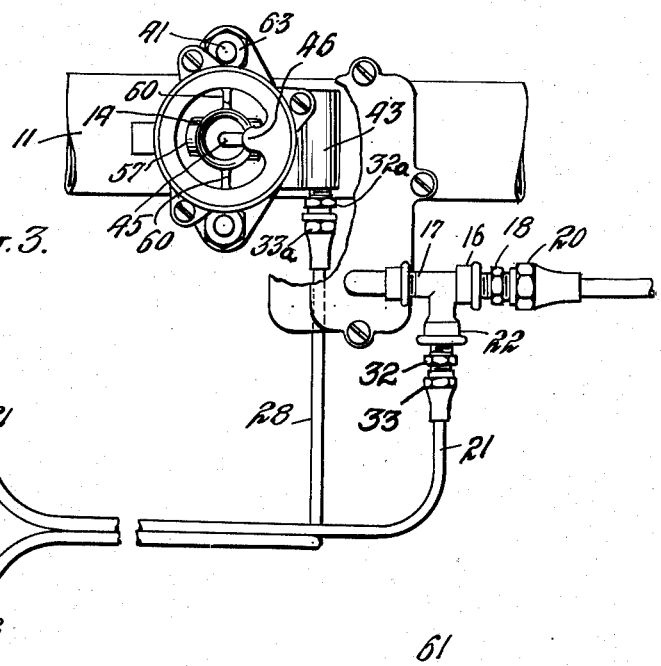

2,623,512

UNITED STATES PATENT OFFICE 2,623,512

GAS SAVING DEVICE AND STARTING AUXILIARY FUEL INJECTOR FOR INTERNAL-COMBUSTION ENGINES

Thomas C. Leake, New York, N. Y.

Application June 8, 1950, Serial No. 166,848

10 Claims. (Cl. 123—180)

This invention relates to internal combustion engines used in motor vehicles, and particularly to engines in which the fuel-air mixture is supplied to the cylinders of the engine by means of a carburetor, through an intake manifold.

A portion of the unit described and claimed herein represents an improvement on the Fuel Injector for Starting Internal Combustion Engines, shown in my co-pending application, Serial Number 155,325, filed April 11, 1950, now Patent 2,582,637, January 15, 1952.

The primary portion of the apparatus, comprises a fuel atomizing device, mounted in the intake manifold of an engine, for the purpose of improving the atomization and distribution of the fuel, suspended in the fuel-air mixture, fed from the carburetor through the intake manifold, to the engine cylnders, and to reduce the deposit of liquid fuel, formed on the inner surface of the walls of the intake manifold to a minimum.

With the wide variety of fuels available for motor vehicle engines, and the extreme and varied conditions through which these engines must operate, obtaining a uniform mixture of vaporized or finely divided fuel and air from a carburetor, and distributing the mixture through the manifold to the various cylinders, in such a manner as to obtain uniform mixtures in all of the cylinders, regardless of their relative distance from the inlet pipe at the center of the manifold, has always presented an extremely difficult problem.

The abrupt change of direction of the fuel-mixture, when it enters the well of the manifold from the intake pipe, and passes through the tubular passages of the manifold, causes a portion of the particles of fuel, because of their inertia, to leave the main stream of the fuel mixture and be deposited on the manifold walls. This changes the ratio of fuel in the fuel-air mixture, resulting in a leaner mixture being fed to the cylinders than that delivered by the carbureter, with consequent inefficient combustion and uneven operation of the cylinders.

Another of the problems encountered in fuels of relatively low volatility, particularly in cold weather, and during the starting period, when the intake manifold is cold, is the deposit of liquid fuel on the inner walls of the manifold, from the mixture fed to the manifold by the carburetor.

After a certain amount of liquid fuel is deposited on the manifold walls, subsequent charges of fuel-air mixture, from the carburetor, tend to pick up a portion of the liquid fuel from the manifold walls and carry it to some of the cylinders.

Due to the higher relative weight of the liquid fuel, it is carried only a short distance, and tends to concentrate in the cylinders closest to the intake pipe, and after it reaches these cylinders, tends to deposit on the spark plugs and valves, thus fouling the spark plugs, and forming carbon deposits which seriously interfere with engine performance, after a certain length of time.

The variation in mixtures, from one group of cylinders to another, also causes irregularity of operation, of the cylinders, and consequently vibration of the engine.

The primary object of my invention is to provide an atomizing device, mounted within the manifold of an engine, to aid in the equal distribution of the fuel-air mixture through the manifold, to attain a better ratio of air and gas, and to improve the vaporization of the fuel-air mixture supplied to the cylinders.

A further object is to provide an atomizing device which can be installed in an engine of the conventional type, without machine work, or removing any of the major parts of the engine, or interfering with the carbureter adjustment, in the process of installation.

A further object is to combine with the fuel atomizing unit, a manually-controlled device, which will inject a spray of finely divided liquid fuel, through the atomizing unit, into the manifold, to facilitate starting the engine in cold weather.

Another object is to provide a combined support for the atomizing unit, and the starting fuel-injection device, so they can be installed simultaneously, and be supported by the manifold and carbureter without additional support elements, other than those normally provided in internal combustion engines.

A fundamental object is to provide a simple, compact device, which may be produced at relatively low cost, and can be installed and operated by persons without special skills or experience.

The accompanying drawings, illustrative of one embodiment of my invention, together with the description of its construction and the method of installation and operation thereof, will serve to clarify further objects and advantages of my invention.

In the drawings:

Fig. 1 represents a side elevation of the carbureter assembly, showing the starting fuel injection mechanism, and a vertical section through the intake manifold, and the manifold venturi, taken at 1—1, Fig. 2.

Fig. 2 is a front elevation of the carbureter and the auxiliary fuel tubes, of Fig. 1, and a vertical cross-section through the intake manifold, taken at 2—2, Fig. 1.

Fig. 3 is a plan view of a portion of the carbureter, the auxiliary fuel tubes, and the injection control valve, of Fig. 1, with a portion of the carbureter removed, to show intake pipe section of the intake manifold, and the venturi.

Fig. 4 is a rear elevation of the unit, showing the front of the valve support bracket plate, and the valve control lever of Figs. 1 and 2.

Fig. 5 represents a vertical section through the insert flange and the venturi of Fig. 1 and a partial rear view of the venturi, taken at 5—5, Fig. 1.

Fig. 6 is a plan view of the insert flange, the manifold venturi, and the injector tube, of Figs. 1 and 5.

It will be understood that the following description of the construction, installation and method of operation of the auxiliary fuel injector and atomizer, is intended as explanatory of the invention and not restrictive thereof.

In the drawings, the same reference numerals designate the same parts throughout the various views, except where otherwise indicated.

Figs. 1 and 2 show the carburetion system of the conventional type of motor vehicle internal combustion engine, comprising a carbureter 10, which feeds a mixture of fuel and air through an intake manifold 11, to the cylinders, the liquid fuel being supplied to the carbureter from the fuel tank, by a tubular fuel line 12, with a starting auxiliary fuel injection attachment inserted between the fuel line and the manifold, and a Venturi tube 14, for deflecting the fuel-air mixture from the carbureter, and the fuel from the auxiliary fuel injector, and directing the fuel-air mixture along the manifold passages, mounted in the intake pipe section 15 of the intake manifold.

In the construction, shown in Figs. 1, 2 and 3, a T 16, or other suitable type of fitting, may be threadably inserted into the carbureter fuel line opening, by means of pipe threads, or other suitable form of threads, formed at the end of main body 17 of the T, the opposite end threadably receiving the threaded end of an adapter 18, the opposite end of which fits into a tube coupling nut 20, the flared end of the fuel line tube 12, being gripped between the coupling nut and the adapter.

An auxiliary fuel tube 21, of smaller diameter, than the regular fuel line, may be attached to the perpendicular leg 22 of the T, to connect the T with a rotating stem, tapered seat, or other suitable form of valve assembly 23, mounted on the plate 24, of an L-shaped bracket 25, or a plate, attached to the instrument board of the vehicle, or mounted at any other suitable point in the driving compartment of the vehicle, convenient to the driver.

An auxiliary return tbue 28, similar to the auxiliary tube 21, may be incorporated, to connect the opposite end of the valve 23 with an insert flange 29, interposed between the carbureter flange 30, and the manifold flange 31, as indicated in Fig. 1.

One end of the auxiliary tube may be connected to the perpendicular leg 22 of the T, by means of an adapter 32, to which a tube coupling nut 33 is threadably fitted, the flared end of the tube being gripped between the coupling nut and the adapter.

An elbow 35, a T, or other suitable type of fitting, may be threadably fitted to the inlet end of the body 36, of the valve assembly 23, the threads formed on the perpendicular leg 37 of the elbow, being inserted into an opening formed in the valve body, the body 38 of the elbow being connected to one end of the auxiliary tube, by means of a coupling nut 33b, threadably attached to the opposite end of the body 38, of the elbow, the threads formed in the body of the elbow, and the coupling nut, supporting the flared end of the tube 21.

In the construction shown in Fig. 3, an extension of the body of the elbow, may be attached to the bracket plate 24, by means of a screw 40, or other suitable attaching means, the valve body 36, being supported between the two elbows 35 and 35a, mounted on opposite sides of the valve.

The valve 23 may be directly attached to the bracket plate 24 by means of straps, screws, or other suitable attaching means, an elbow or other suitable fitting, being utilized to connect the valve with the end of the auxiliary tube, in place of the screwed elbow shown in Fig. 3.

A similar elbow, or fitting 35a, may be attached to the opposite end of the valve body, and supported on the plate bracket, in substantially the same manner, a coupling nut 33c, being threadably attached to the body of the elbow, to support one end of the auxiliary return tube 28.

The insert flange 29, mounted between the carbureter flange 30, and the intake manifold flange 31, may be clamped between the carbureter and intake manifold flanges, by the studs 41, which are replacement studs, longer than the studs which normally attach the intake manifold flange to the carburetor flange, unless the regular carburetor flange studs are long enough to take the added thickness of the insert flange, Vellumoid, paper or other suitable form of gaskets 42, may be inserted between the carbureter and manifold flanges, and the corresponding faces of the insert flange 29, to seal the carbureter openings.

As indicated in Figs. 1 and 3, a boss 43 may be formed integral with, or attached to the insert flange 29, an adapter 32a, threadably fitted to an opening formed in the boss, and a coupling nut 33a, threadably mounted thereon, connecting the inner end of the auxiliary return tube 28 to the insert flange.

A small diameter, formed injector tube 45, may be inserted in and soldered, brazed, or otherwise attached to an opening formed in a boss 46, attached to, or formed integral with the insert flange, a substantially horizontal opening, formed in the flange, and the boss, connecting the inlet opening 47, in the insert boss, Fig. 6, with the interior of the injector tube and the auxiliary return tube 28.

The injector tube may be bent, as indicated in Fig. 1, the free end 48, fitting into the formed central opening 50, formed in the manifold venturi 14, mounted in the intake pipe section 15, of the manifold. The free end 48, of the injector tube may have an outlet opening formed therein, the opening being of substantially the same size as that of the balance of the tube, or the free end of the tube may be swaged inward, to reduce the size of the outlet opening in the injector tube.

The venturi 14, which is mounted in the center of the intake pipe section 15, of the intake manifold, as indicated in Figs. 1 and 2, comprises a shaped tubular upper section 53, which flares outward as indicated in Fig. 1, the lower end connecting with two horizontal substantially cylindrical sections 55 and 55a, formed integral therewith, and located in substantially the center of the manifold passages 56.

The inlet opening 50, at the upper end of the venturi, connected with two substantially circular outlet openings 57 and 57a, formed at the bottom of the venturi, a pair of fillets 58, of relatively large radius, formed at the center of the outlet openings, which meet at a point 59, at the center of the inlet opening, divide the fuel-air mixture, fed from the carbureter, through the inlet opening of the venturi, into two sections, which pass through the outlet openings of the venturi, from which they pass into the intake manifold passages, the path of the mixture at the venturi outlets following the axis of the manifold tube passages, thus directing the mixture toward the cylinders, located at both sides of the manifold intake pipe section.

This results in better atomization of the fuel, as it passes from the carbureter to the intake manifold, eliminates the sharp change in direction, when the fuel-air mixture normally strikes the wall of the manifold, thus reducing manifold condensation, and the deposit of liquid fuel on the inner wall of the manifold, to a minimum, and obtaining more uniform fuel distribution in the cylinders.

The venturi 14 may be attached to the insert flange by two sloping arms 60, of rectangular or other suitable cross-section, the lower end of which are attached to, or formed integral with the outer wall of the venturi, with the upper end thereof cast integral with the opposite sides of the wall, surrounding the central opening 61 of the insert flange, or attached to the wall of the flange by soldering, brazing, or other suitable attaching means.

The free end of the injector tube extends into the center of the venturi 14, as indicated in Fig. 1, the outlet end being in substantial alignment with the restricted area 62, near the top of the Venturi opening.

The insert flange assembly may be mounted in the engine by removing the two nuts 63, mounted on the studs 41, connecting the carbureter outlet flange 30, with the intake manifold flange 31, and lowering the manifold, or raising the carbureter, whichever is more convenient. The two gaskets 42, mounted between the insert flange and the carbureter and manifold flanges, respectively, are then inserted, the insert flange assembly mounted in the position shown in Fig. 1, and the two studs, or longer replacement studs 41, inserted in the openings formed in the carbureter flange, after which the nuts 63 are replaced, the assembly being complete except for the assembly of the auxiliary tube 21, and the auxiliary return tube 28.

The fuel spray, which passes through the injector tube, is started when the valve 23 is opened by angularly moving the valve-actuating lever 64, shown in Fig. 4, the fuel passing directly into the venturi, from the auxiliary return tube 28.

In the venturi, the spray of finely atomized fuel mixes with the stream of air, and finely divided, or vaporized fuel, which is further broken up as it passes through the venturi, thus providing an additional supply of finely atomized fuel, the combined mixture passing along the intake manifold passages, into the individual cylinders, thus greatly facilitating the starting of the engine, particularly in cold weather, or when low end-point fuels are used.

In installing the unit, shown in Figs. 1, 2 and 3, in the conventional type of motor vehicle, the fitting connecting the fuel line 12 to the carbureter is removed and replaced by the T 16, shown in Fig. 3, the adapter 18 being inserted through the fuel-line coupling nut 20, and the T, to reconnect the fuel line to the carbureter.

The valve plate bracket assembly, shown in Figs. 3 and 4, may be assembled by connecting the two valve elbows 35 and 35a, or fittings, to the two ends of the valve body, by inserting the tapered pipe threads, or other suitable form of thread, formed in the perpendicular leg 37, of each of the valve elbows 35 and 35a, into the threaded openings, at the ends of the valve body.

The valve actuating lever 64, attached to the valve stem, may be projected through an opening 67, formed in the bracket plate, as shown in Fig. 4, after which the screws 40 may be inserted through the plate 24 into the valve elbows, to attach the elbows and the valve assembly to the plate bracket.

The right-angle flange 68 may be attached to the instrument panel of the vehicle, in the front of the driver's compartment, by means of screws 70, bolts and nuts, depending upon the location of the bracket and the construction of the instrument panel.

The two ends of the auxiliary tube 21 may be connected to the carburetor T 16 and the valve elbow 35, by means of the adapters 32 and coupling nuts 33.

The insert assembly, including the venturi and the injector tube, may be mounted between the carburetor and the manifold flanges, the venturi and the injector tube being inserted in the manifold, in the manner hereinbefore described.

The two ends of the auxiliary return tube may be connected to the valve elbow 35, and the boss 43, of the insert flange, by threadably inserting the adapter 32 in the opening formed in the flange boss at one end, and connecting a coupling nut, with the flared end of the tube mounted therein, to the opposite end of the adapter, in the flange boss, and directly connecting a coupling nut to the threads formed in the body of the elbow at the opposite end.

The construction of the insert flange 29, the outer contour thereof and the size, location, and spacing of the stud openings may be altered to suit the requirements of the carburetor of the engine, for which a particular installation is designed.

The valve assembly 23, shown in Figs. 3 and 4, may be of the rotatable stem type, seated in a tapered seat, or any other suitable form of valve may be substituted therefor.

The valve-actuating lever 64, as shown in Figs. 3 and 4, may be of the type indicated, or a control knob, or other suitable type of valve-actuating mechanism may be substituted therefor.

A coiled torsion spring, or other suitable type of spring, or automatic valve closing device, may be mounted on the stem of the valve, and attached to the valve-actuating lever, to automatically shut off the valve, when the operator removes his fingers from the control lever.

The valve plate bracket 25, shown in Figs. 1 and 4, may be made in the form indicated, with a perpendicular attaching flange formed integral with the plate, or a flat plate may be attached directly to the instrument panel, by a plurality of bolts, screws, or other suitable attaching means, the valve control lever projecting through an opening formed in the instrument panel.

All parts of the unit, except the insert flange, would be suitable for universal application for all types of vehicles, the auxiliary tube and the auxiliary return tube being cut to the length required, depending upon the relative location of the carbureter, and the instrument panel, the tubes being bent, as required, to clear any obstructions, and to join the fittings in the required relative position.

The construction may be applied to internal-combustion engines, used in marine, stationary, industrial, or other types of installation, with equal facility to its adaptation to motor vehicles.

The size, form, and contour of the venturi may be altered considerably, depending upon the size and form of the manifold, and the distance between the manifold flange and the fuel-air passages, formed in the manifold.

In internal-combustion engines having eight or more cylinders, and fed by a carburetor having a dual throat, two injector tubes may be mounted on the insert flange, in place of the one shown in Figs. 1 and 5, each tube fitting into the corresponding intake pipe section of the intake manifold.

In such installations, a double-inlet venturi, or a venturi fitted with a long, oval-shaped inlet opening, may be provided, the outlet openings of the venturi facing in opposite directions, as indicated in Fig. 1, each outlet opening being connected to one of the inlet openings of the venturi.

In place of the dual-inlet venturi, two separate venturis may be provided, in installations of this type, each venturi being fed by one of the openings in the carburetor. In such installations, each venturi would be substantially L-shaped, there being only one outlet opening in each venturi, the two outlet openings facing in opposite directions.

The venturi, or fuel atomizing portion of the unit functions at all times, while the engine is in operation, to atomize the fuel in the fuel-air mixture, and direct the mixture along the passages in the intake manifold.

The fuel injection apparatus operates only when the engine is being started, when the operator manually opens the auxiliary fuel valve, the auxiliary fuel supply, through injector tube, being shut off again, when the engine is started, and the auxiliary fuel valve closed.

The installation requires no special tools, equipment, or skill on the part of the mechanic making the installation, beyond that usually possessed by the ordinary mechanic engaged in this work.

It will be apparent to those skilled in the art that my present invention is not limited to the specific details described above and shown in the drawings, and that various further modifications and adaptations are possible, in carrying out the features of the invention without departing from the spirit and scope of the appended claims.

What I claim is:

1. An attachment for an internal-combustion engine, fitted with a carburetor, a fuel line, and an intake manifold, comprising an insert mounted between the carburetor and the intake manifold, a venturi, attached to said insert, mounted in the intake manifold, said venturi having a pair of oppositely directed outlets, formed in substantial alignment with the intake manifold passages, said Venturi outlets directing the fuel-air mixture from the carburetor, along the intake manifold passages, an injector tube attached to said insert, the outlet end of said injector tube, projecting into the venturi, means connecting said injector tube to the fuel line, valve means controlling the flow of fuel to said injector tube, and means manually controlling said valve means.

2. An attachment for an internal-combustion engine, fitted with a carburetor, a fuel line, and an intake manifold, comprising an insert flange, mounted between the carburetor and the intake manifold, a venturi attached to said insert flange, mounted in the intake manifold, said venturi comprising an inlet section mounted in substantial alignment with the intake manifold carburetor opening, with a pair of oppositely directed outlets formed in said venturi, in direct communication with the inlet section, and in substantial alignment with the intake manifold passages, said outlets directing the fuel-air mixture from the carburetor, along the intake manifold passages, injection means attached to said insert flange, said injection means projecting into the mixture directing means, auxiliary fuel tubes connecting said injection means to the carburetor fuel line, manually-operated valve means controlling the flow of fuel from the fuel line to the injection means, a portion of the fuel from the fuel line being sprayed through the injection means and the Venturi outlets into the manifold passages, when the valve is opened.

3. An attachment for an internal-combustion engine, fitted with a carburetor, and an intake manifold, comprising an insert flange, mounted between the carburetor and the intake manifold, and a venturi, attached to said insert flange, mounted in the intake manifold, said venturi comprising an inlet section, mounted in substantial alignment with the intake manifold carburetor opening, with a pair of oppositely directed outlets formed in said venturi, in direct communication with the inlet section, and in substantial alignment with the intake manifold passages, said Venturi outlets directing the fuel-air mixture from the carburetor, along the intake manifold passages.

4. An attachment for an internal-combustion engine, fitted with a carburetor, and an intake manifold comprising an insert flange, interposed between the carburetor and manifold flanges, a venturi removably mounted in said intake manifold, a pair of arms, formed integral with said venturi, attached to the insert flange, said venturi comprising an inlet section, mounted in substantial alignment with the intake manifold carburetor opening, said venturi having a pair of oppositely directed outlet passages formed therein, in communication with the inlet and in substantial alignment with the manifold passages, a pair of arcuate wall fillets separating said Venturi outlet passages, said fillets and Venturi outlet passages directing the fuel-air mixture from the carburetor, along the intake manifold passages.

5. In a vehicle, driven by an internal-combustion engine, fitted with a carburetor, a fuel line, and an intake manifold, an attachment, comprising a fitting interposed between the carburetor and the fuel line, an insert flange, mounted between the connecting flanges of the carburetor and the intake manifold, a venturi, attached to said insert flange, mounted in the intake manifold, said venturi having outlets formed in substantial alignment with the intake manifold passages, an injector tube attached to said insert flange, the outlet end of said injector tube projecting into the venturi, auxiliary fuel tubes connecting said insert flange and the injector tube to the carburetor fitting, a valve, mounted in the driving compartment of said vehicle, connected into said auxiliary fuel tubes, means manually controlling said valve, a portion of the fuel from the fuel line being sprayed through the injector tube and the venturi, into the manifold passages, when the valve is opened.

6. In a motor vehicle, driven by an internal-combustion engine, fitted with a carbureter, a fuel line, and an intake manifold, an attachment, comprising a fitting interposed between the carbureter inlet and the fuel line, an insert flange interposed between the carbureter outlet and the intake manifold, means clamping the insert between the carbureter and the manifold, a venturi, attached to said insert flange, mounted in the intake manifold, said venturi comprising an inlet section, mounted in substantial alignment with the intake manifold opening, with outlets, formed in said venturi, in communication with the inlet and located in substantial alignment with the intake manifold passages, an injector tube attached to said insert, the outlet end of said injector tube projecting into the venturi, auxiliary fuel tubes connecting said insert flange and the injector tube to the fuel line fitting, a valve mounted in the operating section of said vehicle, connected into said auxiliary fuel tubes, means manually controlling said valve, a portion of the fuel from the fuel line being sprayed through the injector tube and the venturi, into the manifold passages, when the valve is opened.

7. In a vehicle, driven by an internal-combustion engine, fitted with a carburetor, a fuel line, and an intake manifold, an attachment, comprising an insert flange, interposed between the outlet end of the carbureter and the intake manifold, a venturi, attached to said insert, mounted in the intake manifold, said venturi directing the fuel-air mixture from the carbureter, along the intake manifold passages, auxiliary fuel tubes connecting the carbureter fuel line to the insert flange, a tubular injector attached to the insert flange, the outlet end of said injector projecting into the venturi, said insert flange having a plurality of passages formed therein, connecting the auxiliary fuel tube with the injector tube, a valve, mounted in the operating section of said vehicle, connected into said auxiliary tubes, means, attached to the vehicle, supporting said valve, a lever, manually controlling said valve, projecting through the support means, a portion of the fuel from the fuel line being sprayed through the injector tube and the venturi, into the intake manifold passages, when the valve is opened.

8. In a vehicle, driven by an internal-combustion engine, fitted with a carbureter, a fuel line, and an intake manifold, an attachment, comprising a fitting interposed between the carbureter and the fuel line, an insert flange, interposed between the outlet end of the carbureter and the intake manifold, a venturi, attached to the insert flange, mounted in the intake manifold, said venturi directing the fuel-air mixture from the carbureter, along the intake manifold passages, an injector tube attached to said insert flange, the outlet end of said injector tube projecting into the venturi, a valve mounted in the driving compartment of the vehicle, a bracket attached to the vehicle, a pair of tube fittings, attached to the bracket, connected with and supporting the valve, an auxiliary fuel tube connecting the carbureter fitting to one of said tube fittings, an auxiliary return tube connecting the opposite fitting to the insert flange, said insert flange having a plurality of passages formed therein, connecting the auxiliary return tube to the injector tube, a valve control lever projecting through said bracket, a portion of the fuel from the fuel line being sprayed through the injector tube and the venturi, into the manifold passages, when the valve is opened.

9. In a vehicle, driven by an inernal-combustion engine, fitted with a carbureter, a fuel line, and an intake manifold, an attachment, comprising a fitting interposed between the carbureter and the fuel line, an insert flange, mounted between the connecting flanges of the carbureter and the intake manifold, a venturi, attached to said insert flange, projecting into the intake manifold, said venturi having a plurality of outlets formed in substantial alignment with the intake manifold passages, an injector tube attached to said insert, the outlet end of said injector tube projecting into the venturi, auxiliary fuel tubes connecting said insert flange and the injector tube to the carbureter fuel line fitting, a valve, mounted remotely from said engine, connected into said auxiliary fuel tubes, a control handle manually controlling said valve, means supporting said valve, and the tube ends attached thereto, on the vehicle, a portion of the fuel from the fuel line being sprayed through the injector tube and the venturi, into the manifold passages, when the valve is opened.

10. In a motor vehicle driven by an internal-combustion engine, fitted with a carbureter, a fuel line, and an intake manifold, an attachment, comprising a fitting interposed between the carbureter inlet and the fuel line, an insert flange interposed between the carbureter outlet and the intake manifold, means clamping the insert flange between the carbureter and the manifold, a venturi, attached to the insert flange, projecting into the intake manifold, said venturi comprising an inlet section, mounted in substantial alignment with the intake manifold opening, with a plurality of outlets formed in said venturi, substantially perpendicular to the inlet, located in substantial alignment with the intake manifold passages, means separating said outlets to direct the fuel-air mixture through the intake manifold passages, an injector tube attached to said insert, the outlet end of said injector tube projecting into the venturi, auxiliary fuel tubes connecting said insert flange and the injector tube to the carbureter fuel line fitting, a valve, mounted remotely from said engine, connected into said auxiliary fuel tubes, a bracket, supporting said valve, and the tube ends attached thereto, on the vehicle, a handle manually controlling said valve, a portion of the fuel from the fuel line being sprayed through the injector tube and the venturi, into the intake manifold passages, when the valve is opened.

THOMAS C. LEAKE.

REFERENCES CITED

The following references are of record in the file of this patent:

UNITED STATES PATENTS

| Number | Name | Date |
|---|---|---|
| 1,370,801 | Elwell | Mar. 8, 1921 |
| 1,456,018 | Wiegand | May 22, 1923 |
| 1,646,321 | Siegmann | Oct. 18, 1927 |
| 1,704,832 | Higgins | Mar. 12, 1929 |

FOREIGN PATENTS

| Number | Country | Date |
|---|---|---|
| 265,767 | Italy | of 1929 |